United States Patent Office 3,514,160
Patented May 26, 1970

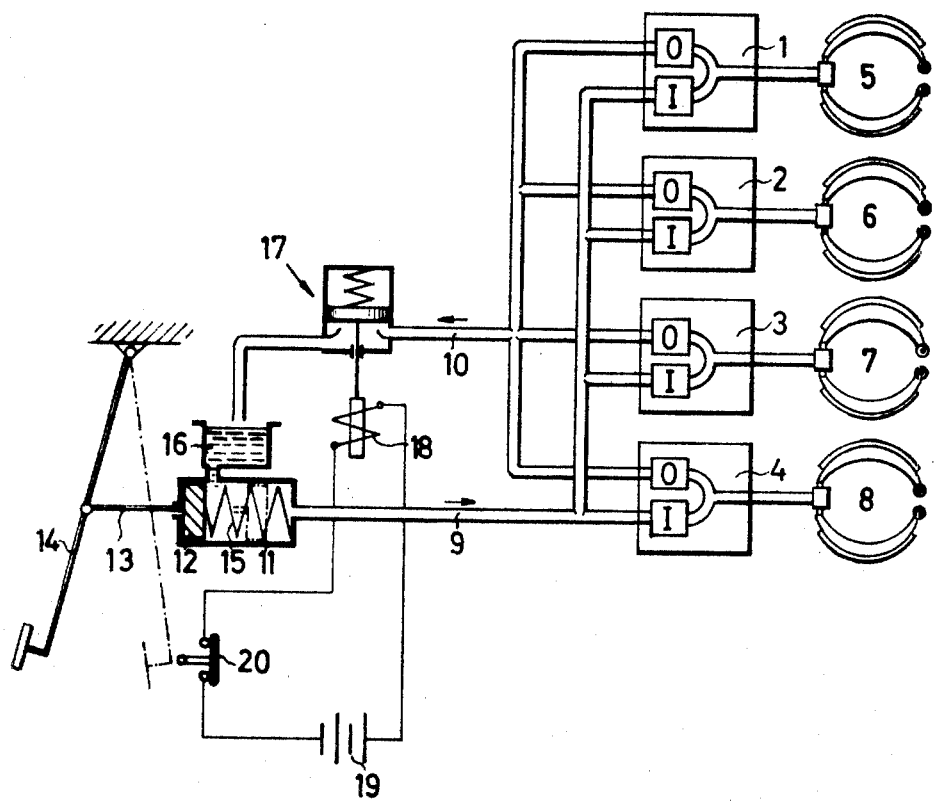

3,514,160
ANTIWHEEL-LOCKING BRAKE CONTROL
SYSTEM SAFETY DEVICE
Heinz Leiber, Leimen, Germany, assignor to Teldix
G.m.b.H., Heidelberg, Germany
Filed Nov. 21, 1968, Ser. No. 779,298
Claims priority, application Germany, Nov. 21, 1967,
1,655,457
Int. Cl. B60t 17/18, 8/00
U.S. Cl. 303—21                          6 Claims

ABSTRACT OF THE DISCLOSURE

A brake control system for preventing wheel locking which is suitable for use with hydraulically actuated brakes of wheeled vehicles. The system includes a safety device which inhibits the operation of the brake control system before it discharges all the available hydraulic fluid from the portion of the brake system which supplies the fluid under pressure. The safety device includes a shut-off valve arranged in the fluid return line that returns the discharged fluid to the fluid reservoir. When the brake actuating mechanical linkage (e.g. the brake pedal) reaches a predetermined position near the end of its travel, the shut-off valve is closed and the fluid is prevented from returning to the reservoir.

BACKGROUND OF THE INVENTION

The present invention relates to motor vehicle wheel brakes and, more particularly, to a brake control system for preventing the wheels of a vehicle from locking as a result of excessive brake pressure.

Piston operated hydraulic vehicle brakes having antiwheel-locking control systems are known in the art. One such brake system is provided with a main pressure line which supplies the brake fluid from the master brake cylinder to the wheel brake cylinders and a fluid return line, which returns the brake fluid that is discharged from the wheel brake cylinders and the main pressure line when the brake control system acts to reduce the brake pressure, to a storage container that holds a supply of brake fluid. In an antiwheel-locking control system of this type, wherein the discharge from the main pressure line and the wheel brake cylinder into the pressure-free return line is electrically controlled, it is necessary to provide some mechanism which limits the fluid discharge as soon as the mechanical linkage which drives the master brake piston to produce the hydraulic pressure reaches a desired safe distance from its mechanical limit stop; that is, a position shortly ahead of its extreme end position.

If such a device for limiting the fluid discharge from the brake system is not provided, there is a danger that the continuous discharge of small quantities of fluid will eventually empty the entire fluid content of the master brake cylinder. This danger is especially acute when the stopping conditions of the road are poor or when the vehicle is continuously braked on a downhill grade. If the fluid in the master brake cylinder is allowed to be discharged in this way, the brake pedal will reach the end of its available pedal travel or another part of the brake linkage will run against a limit stop. This may well cause the driver of the vehicle to be suddenly so surprised by the loss of brake force as to temporarily forget that the master brake cylinder must be refilled by "pumping" the brake pedal. It is therefore preferable to interrupt the recurrent fluid discharge by the antiwheel-locking brake control system so that at least an uncontrolled effective braking force will remain in effect.

In the case of brake control systems in which the brake fluid discharge is effected by an electrically actuated normally closed outlet valve connected between each wheel brake cylinder and the return line, it has been suggested that an electric limit switch be provided which, when actuated, inhibits the operation of each outlet valve. This limit switch is suitably arranged to be actuated directly by the mechanical linkage (e.g. the brake pedal), when the brake pedal nears the end of its travel. This solution depends, for its effectiveness, on the proper operation of each outlet valve. If any outlet valve fails to function, for example as a result of dirt in or wear of the valve seat, and fails to seal properly, the very occurrence will result which this solution seeks to avoid.

SUMMARY OF THE INVENTION

An object of the present invention, therefore, is to provide means, which function independently of the outlet valve or valves of a brake control system, for preventing the continuous discharge of hydraulic brake fluid from the main pressure line and the wheel brake cylinders of a hydraulic brake system.

This object, as well as other objects which will become apparent in a discussion that follows, is achieved, according to the present invention, by providing a separate electromagnetically actuated valve in the return line of the brake control system and providing means to close this valve when the master brake piston-driving mechanical linkage has moved to a position a predetermined distance from its limit stop.

The separate valve can be located in the portion of the return line which collects the discharged fluid from all the various controlled wheel brakes.

The more brake control units (and, thus, the more outlet valves) a vehicle has, the greater will be the chances that one of its outlet valves will fail, causing the entire brake system to become inoperative. The provision of a single return-line shut-off valve, according to the present invention, is sufficient to eliminate this danger.

The shut-off valve is preferably controlled by a separate electrical switch which is opened, or closed, by one of the members of the above-mentioned mechanical linkage. Also, for reasons of safety, the switch and the shut-off valve are preferably connected in such a way that the valve will be caused to close in the absence of current.

Since the safety device according to the present invention thus operates independently of the antiwheel-locking control system, its use is not restricted to those brake control systems which are electrically operated.

BRIEF DESCRIPTION OF THE DRAWING

The single figure is a schematic diagram of a controlled vehicle brake system which incorporates a preferred embodiment of the safety device according to the present invention.

DESCRIPTION OF THE PREFERRED EMBODIMENT

Referring now to the drawing, the single figure shows a vehicle brake system having four control units 1, 2, 3 and 4, which regulate the brake pressure applied to the brake cylinders of the individual wheel brakes 5, 6, 7 and 8, respectively. The hydraulic fluid is supplied under pressure through the individual control unit 1–4 from a master brake cylinder via a main pressure line 9. Under normal braking conditions, when none of the wheel brakes 5–8 has a tendency to block, the control units 1–4 directly connect the main pressure line 9 to the individual wheel brake cylinders.

The control units 1–4 are also connected to the hydraulic fluid supply container 16 via a return line 10. If it is necessary to reduce the hydraulic pressure in one or more of the wheel brake cylinders in order to prevent a certain wheel or wheels from slipping, those particular wheel brake cylinders are disconnected by their respective control units from the main pressure line 9 and are connected to the return line 10.

The above-described operation of the control units 1–4 is accomplished in each by means of two valves; namely an inlet valve (marked "I") connecting, when open, the main pressure line 9 to the respective wheel brake cylinder and an outlet valve (marked "O") connecting, when open, the brake cylinder with the return line 10. The inlet and outlet valves of each unit are controlled independently of each other in dependency upon the condition of rotational motion of their respective wheel so as to maintain the wheel slip in that region in which the frictional force between the wheel and the road is a maximum.

The main pressure line 9 obtains the hydraulic pressure from the master brake piston 12 which moves within the master brake cylinder 11. The piston 12 is connected to a brake pedal 14 by means of actuating rod 13. A pressure spring 15 biases the piston towards its normal position, shown in the figure at the left-hand end of the master brake cylinder 11. The brake fluid reservoir 16 inserts the brake fluid in the master brake cylinder at atmospheric pressure at a point slightly ahead of the piston, when the piston is in its normal position as shown.

According to the invention, an electromagnetically actuated shut-off valve 17 is arranged in the return collecting line 10 at a point ahead of the reservoir 16. The magnet winding 18 of this valve is connected with a source of voltage 19 via a normally closed switch 20. The valve magnet is therefore normally excited and maintains the valve in the open position. If the switch 20 is opened, the valve 17 will be caused to close by a biasing return spring.

When the brake pedal is actuated, the master brake piston 12 forces brake fluid under pressure through the main pressure line 9 and its various branches and through the normally open inlet valves in the control units 1–4 to the individual wheel brake cylinders, causing the brakes to actuate. As soon as one wheel skids (locks) or exhibits a tendency to lock, the corresponding inlet and outlet valves close and open, respectively. The resulting discharge of a greater or lesser quantity of fluid through the return line 10 and the open valve 17 to the supply container 16 causes a drop in the brake pressure applied to this wheel.

If now, as a result of a leak in an outlet valve, an error in the control system for one of the outlet valves or simply as a result of normal brake control operations under extremely poor road conditions an abnormally large amount of brake fluid is removed from the main pressure line 9 and the wheel brake cylinders, the brake pedal 14 will eventually come to the position shown in dotted-dashed lines in contact with the actuating pin of the switch 20, causing the switch to open. As is shown in dotted-dashed lines, the master brake piston will, at this time, be located a predetermined safe distance from its final position at the right-hand end of the master brake cylinder 11.

The opening of the switch 20 causes the valve 17 to close. As a result, the pressure in the return line 10 will rise until it equals the pressure in the main pressure line 9 and in the wheel brake cylinders. When this occurs, the antiwheel-locking control system will no longer function, thus allowing the driver to continue to brake the vehicle by applying a continued force to the brake pedal.

It is possible, according to the present invention, to construct the valve in the return line as a part of the unit containing the master brake cylinder hydraulic fluid reservoir. If this is done, it is also practical to actuate the switch 20 by the piston rod of the master brake piston.

It will be understood that the above description of the present invention is susceptible to various modifications, changes and adaptations.

I claim:
1. A brake control system for use with hydraulically actuated brakes of wheeled vehicles, comprising, in combination:
   (a) means for supplying a given quantity of hydraulic brake fluid under pressure;
   (b) means for actuating said pressure supply means, said actuating means being movable from a non-actuated to a fully actuated position;
   (c) wheel means including a hydraulically actuated brake, and antiwheel-locking means, the latter having inlet and outlet valve means connected to said brake for controlling the hydraulic pressure applied thereto;
   (d) a conduit between said pressure supply means and said antiwheel-locking means for supplying brake fluid thereto;
   (e) a return conduit between said antiwheel-locking means and said pressure supply means for returning brake fluid to the latter;
   (f) shut-off valve means arranged in said return conduit means; and
   (g) means, acting independently of said valve means of said antiwheel-locking means, for closing said shut-off valve means when said actuating means reaches a predetermined distance from said fully actuated position.

2. The brake control system defined in claim 1, wherein said pressure supply means includes a hydraulic fluid reservoir which stores brake fluid at atmospheric pressure and said return conduit means is connected to return brake fluid to said reservoir.

3. The brake control system defined in claim 1, wherein said actuating means includes a brake pedal and said valve closing means closes said shut-off valve means when said brake pedal is moved a predetermined distance from said fully actuated position.

4. The brake control system defined in claim 1, wherein said shut-off valve means is an electromagnetically actuated valve, and said closing means includes means for selectively connecting said shut-off valve means to a source of electrical power.

5. The brake control system defined in claim 4, wherein said shut-off valve means is closed in absence of electrical excitation.

6. The brake control defined in claim 5, wherein said valve closing means includes normally closed switch means connecting said shut-off valve means with said source of electrical power, said switch means being arranged to be opened when said actuating means reaches said predetermined distance from said fully actuated position.

References Cited
UNITED STATES PATENTS 3,425,751   2/1969   Wehde et al. _____ 303—21

MILTON BUCHLER, Primary Examiner

J. J. McLAUGHLIN, Jr., Assistant Examiner

U.S. Cl. X.R.

188—181; 303—6, 61, 63

UNITED STATES PATENT OFFICE
CERTIFICATE OF CORRECTION

Patent No. 3,514,160   Dated May 26th, 1970

Inventor(s) Heinz Leiber

It is certified that error appears in the above-identified patent and that said Letters Patent are hereby corrected as shown below:

In the heading of the drawing change the inventor's name to --H. Leiber--.

SIGNED AND SEALED
OCT 13 1970

(SEAL)
Attest:

Edward M. Fletcher, Jr.
Attesting Officer

WILLIAM E. SCHUYLER, JR.
Commissioner of Patents